United States Patent
Ishibashi et al.

(10) Patent No.: US 6,463,504 B1
(45) Date of Patent: Oct. 8, 2002

(54) METHOD AND SYSTEM FOR DYNAMICALLY REASSIGNING UNUSED LOGICAL VOLUMES FROM A STORAGE SUBSYSTEM TO AN OPEN SYSTEMS HOST

(75) Inventors: Karen M. Ishibashi, Boulder; Michael A. Gzym, Longmont, both of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,072

(22) Filed: Nov. 8, 1999

(51) Int. Cl.[7] .............................................. G06F 13/00
(52) U.S. Cl. ........................ 711/114; 711/112; 711/147; 711/202; 709/205; 709/213; 710/62
(58) Field of Search ................................. 711/112, 114, 711/202, 147, 148, 151, 163, 167; 710/6, 62, 129; 709/205, 213

(56) References Cited

U.S. PATENT DOCUMENTS

| | | | |
|---|---|---|---|
| 4,837,680 A | 6/1989 | Crockett et al. ............. 364/200 |
| 5,148,540 A | 9/1992 | Beardsley et al. ........... 395/575 |
| 5,761,448 A | 6/1998 | Adamson et al. ............ 395/284 |
| 5,867,686 A | * 2/1999 | Conner et al. ............... 711/168 |
| 6,018,779 A | * 1/2000 | Blumenau ..................... 710/68 |
| 6,073,218 A | * 6/2000 | DeKoning et al. ........... 711/150 |
| 6,115,772 A | * 9/2000 | Crater .......................... 710/129 |

OTHER PUBLICATIONS

"Performance Efficient Multiple Logical Unit Number Mapping for Redundant Array of Independent Disks," *IBM Technical Disclosure Bulletin* vol. 39, No. 05, May 1996.

* cited by examiner

*Primary Examiner*—Do Hyun Yoo
*Assistant Examiner*—Jasmine Song
(74) *Attorney, Agent, or Firm*—Sawyer Law Group LLP

(57) ABSTRACT

A method and system for reassigning unused logical volumes on a storage subsystem to an open systems host that uses logical unit numbers (LUNs). The storage subsystem and the open systems hosts execute respective software processes, and the open systems host is connected to a storage subsystem via an adapter that is controlled from a support controller. The method and system include sending a communication message from the support controller to the adapter, wherein the communication message reassigns the unused logical volumes to LUNs. The method and system further include updating a logical-to-physical mapping stored within the adapter in response to receiving the communication message, whereby storage capacity of the open systems host is increased without suspending the software processes.

13 Claims, 3 Drawing Sheets

METHOD AND SYSTEM FOR DYNAMICALLY REASSIGNING UNUSED LOGICAL VOLUMES FROM A STORAGE SUBSYSTEM TO AN OPEN SYSTEMS HOST

FIELD OF THE INVENTION

The present invention relates to storage subsystems, and more particularly to a method and system for dynamically reassigning unused logical volumes on a storage subsystem to an open systems host.

BACKGROUND OF THE INVENTION

Mainframe computers typically utilize a storage subsystem for storing and accessing huge amounts of data. The storage subsystem is commonly implemented as a direct access storage system (DASD) where many hard disks are organized as a redundant array of inexpensive disks (RAID). The RAID-5 storage architecture, for example, stores data by spreading it over multiple disks along with parity information. If a single disk fails, the parity information allows the system to regenerate that lost data quickly and transparently without interrupting online processing. To the mainframe, a typical storage subsystem RAID data space is one large data space that is accessed through logical volumes.

As data availability needs increase, users see the advantages in making the storage subsystem available not only to mainframe computers, but also to open systems hosts, such as PC's or workstations running Unix and Windows NT operating systems, for instance. The open systems hosts are connected to the storage subsystem through SCSI (Small Computer System Interface) host adapters, or SCSI controllers. The operating systems of most open systems hosts, however, cannot handle the large data spaces provided by logical volumes. Therefore, on the open systems hosts side, the storage subsystem's data space is divided into multiple SCSI logical unit numbers (LUNs).

The benefits of making the storage subsystem available to open systems hosts are that it allows large enterprises to consolidate open systems servers into a single location under similar IT (information technology) management, and allows open systems servers to take advantage of advanced storage functions. However, due to the complexities of server consolidation and new enterprise application development, it is very difficult to plan disk storage capacity requirements for the open systems hosts. Consequently, there may be logical volumes on the mainframe side of the storage subsystem that are not used. In order for the open systems host to access this untapped storage space, these unused logical volumes must be reassigned to open systems host LUNs.

Reassigning unused logical volumes from the storage subsystem to the open systems host LUNs has traditionally required temporarily suspending any software processes in the system that will be affected by the reassignment. This includes any software processes on the storage subsystem and mainframe host that access the logical volumes to be reassigned, as well as any software processes on the open systems host that are to be given access to the reassigned logical volumes. After a check is made that the software processes are not currently modifying any data, the software processes are suspended and an operator manually reconfigures both the mainframe and the open systems host. Suspending the processes of a large enterprise system in this manner and making the system unavailable to clients is not only disruptive and inefficient, but also costly.

Accordingly, what is needed is a method and system for dynamically reassigning unused logical volumes on a storage subsystem to an open systems host. The present invention addresses such a need.

SUMMARY OF THE INVENTION

The present invention provides a method and system for reassigning unused logical volumes on a storage subsystem to an open systems host that uses logical unit numbers (LUNs). The storage subsystem and the open systems hosts execute respective software processes, and the open systems host is connected to a storage subsystem via an adapter that is controlled from a support controller. The method and system include sending a communication message from the support controller to the adapter, wherein the communication message reassigns the unused logical volumes to LUNs. The method and system further include updating a logical-to-physical mapping stored within the adapter in response to receiving the communication message, whereby storage capacity of the open systems host is increased without suspending the software processes.

According to the method and system disclosed herein, reconfiguring the system with real-time messaging provides enterprises with a flexible and cost effective method for using excess storage-subsystem capacity in support of open systems hosts.

DETAILED DESCRIPTION

The present invention relates to a process for dynamically reassigning unused logical volumes to open systems LUNS. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
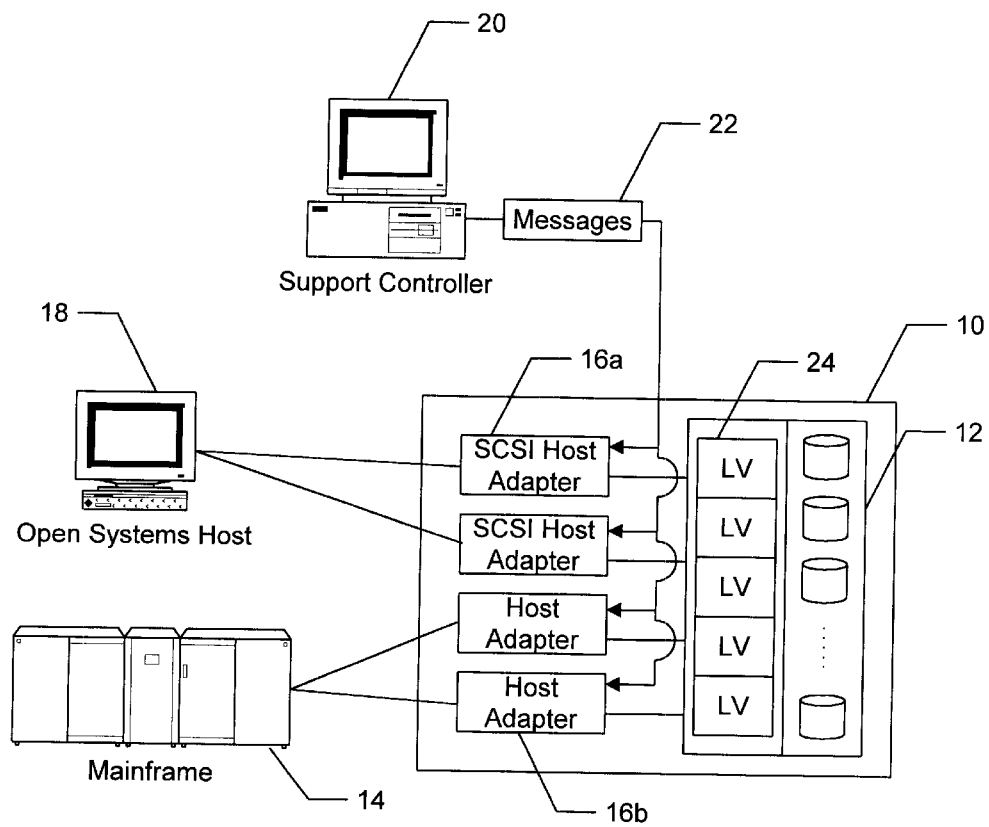
FIG. 1 is a block diagram illustrating the operating system environment for the present invention.

FIG. 1 is a block diagram illustrating the system environment for the present invention. A storage subsystem 10 is implemented as a direct access storage system (DASD) where hard disks are organized as a redundant array of inexpensive disks (RAID) 12. The storage subsystem 10 is accessed by both a mainframe host computer 14 and an open systems host 18. In a preferred embodiment, the mainframe host 14 uses operating systems such as Multiple Virtual Storage/Extended Architecture (MVS/XA) and Virtual Machine (VM), while the open systems host uses operating systems such as Unix and Windows NT.

The storage system 10 also includes SCSI host adapters 16a, for enabling one or more open systems host 18 to access the storage subsystem 10, and one or more mainframe host adapters 16b for enabling the mainframe host 14 to access the storage subsystem 10. The host adapters 16a and 16b include their own microprocessor (e.g., Motorola 2900) and memory for controlling the transference of data.

A PC-based system referred to as a support controller 20 is connected to the storage subsystem 10 that enables an operator to configure and administer the storage system 10. The support controller 20 and the host adapters 16a and 16b run a common operating system for compatibility and communication. In a preferred embodiment of the present invention, the support controller 20 and the host adapters 16a and 16b use the Nucleus Operating System by Accelerated Technology.

Both the open systems host 18 and the mainframe host 14 can be connected to more than one adapter 16a and 16b respectively (hereinafter adapters 16). From the mainframe host 14 side, the storage system 10 is organized as a series of logical volumes (LV) 24 that map on top of the hard disks. From the open systems host 18, the storage system 10 is organized as a series of SCSI logical unit numbers (LUNs) that map to the logical volumes 24.

Initially, the operator assigns storage space from the storage subsystem 10 to the open systems host 18 and the mainframe host 14 via a configuration process that maps logical volumes 24 to physical locations on the disk drives in the storage subsystem 10, which is referred to as a logical-to-physical mapping. This logical-to-physical mapping is stored as tables in the respective adapters 16.

When logical volumes 24 are assigned to the open systems host 18, but go unused by the mainframe host 14 side, it is desirable to reassign the unused logical volumes 24 the open systems host 18. This, however, typically requires suspending any software processes on the storage subsystem 10 and mainframe host 14 that currently access the logical volumes 24 to be reassigned, as well as any software processes on the open systems host 18 that will be given access to the reassigned logical volumes 24.

The present invention provides a method and system for dynamically reassigning unused logical volumes 24 on a storage subsystem 10 to an open systems host 18 without suspending any software processes on the storage subsystem 10, the mainframe host 14, or the open systems host 18. The reassignment process is accomplished through software by sending the reconfiguration information to the hardware adapters 16, which then updates the configuration tables during system operation More specifically, reassigning unused logical volumes 24 to the open systems host 18 is accomplished by sending real-time communication messages 22 from the system controller 20 to the processes running on the individual adapters 16. According to the present invention, the new configuration information with the data of the newly reassigned logical volumes 24 is entered by an operator at the support controller 20 and sent to the affected adapters 16 through real-time operating system messaging.

Figure 2:
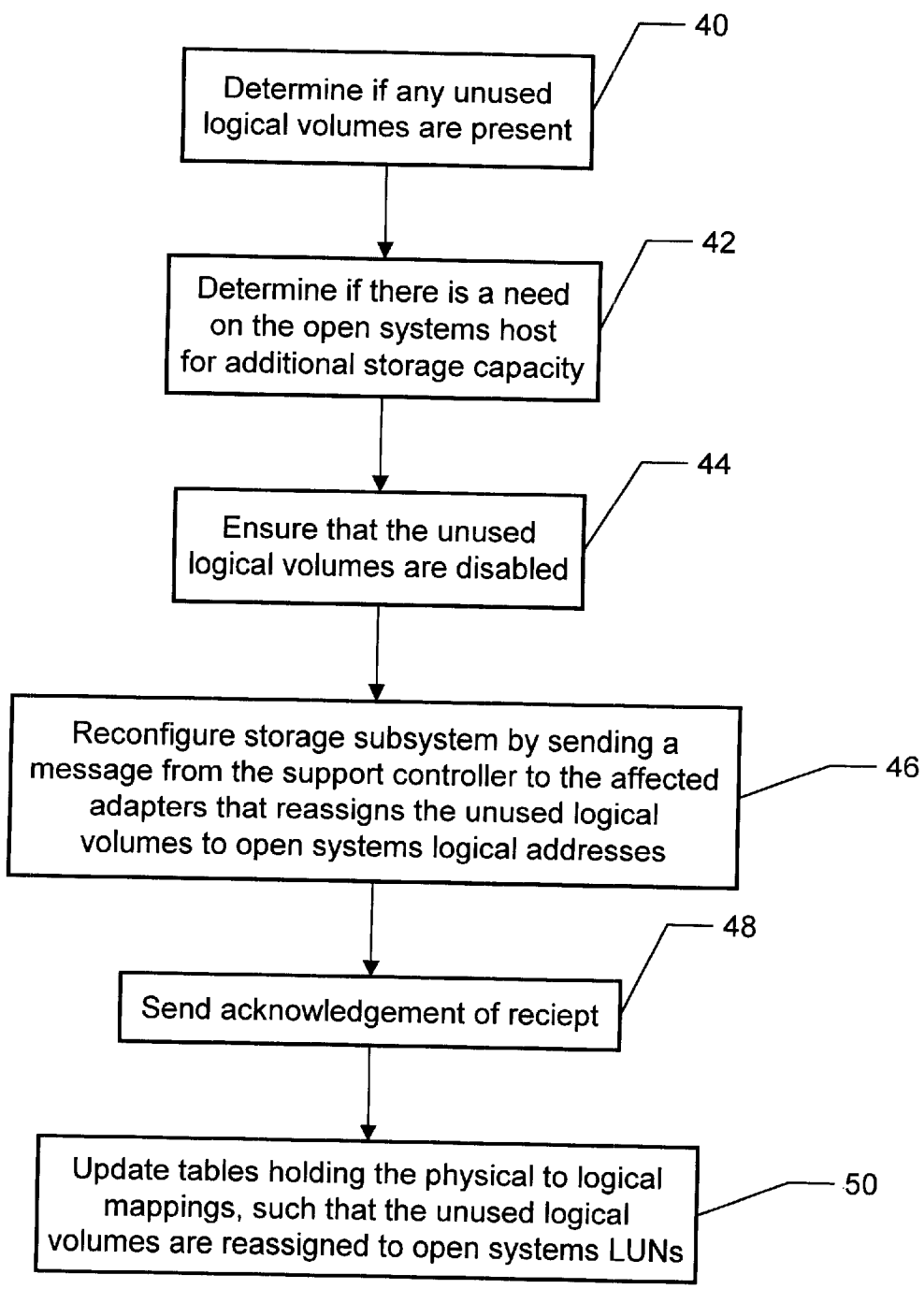
FIG. 2 is a flow chart illustrating the process of dynamically reassigning unused logical volumes on a storage subsystem to an open systems host using real-time messaging in accordance with the present invention.

FIG. 2 is a flow chart illustrating the process of dynamically reassigning unused logical volumes 24 on a storage subsystem 10 to an open systems host 18 using messaging in accordance with the present invention.

The process begins by determining if any unused logical volumes 24 are present on the mainframe host 14 side in step 40, and determining if there is a need on the open systems host 18 for additional storage capacity in step 42. If so, then an operator ensures that the unused logical volumes 24 are disabled in step 44.

The operator then reconfigures the storage subsystem 10 by sending a message 22 from the support controller 20 to the affected adapters 16 to reassign the unused logical volumes 24 to open systems logical addresses in step 46. For the affected host adapters 16a, the support controller 20 sends a message 22 indicating what additional logical volumes 24 are now available to that particular adapter 16a. For the affected mainframe adapters 16b, the support controller 20 sends a message 22 restricting access to the reassigned logical volumes 24. In response to receiving the message 22, the affected adapters 16 return an acknowledgement in step 48, and update their respective tables that hold the logical-to-physical mappings, such that the unused logical volumes 24 are reassigned to open systems LUNs in step 50.

According to the present invention, no system software needs to be suspended to reassign unused logical volumes 24 because the host adapters 16 have the capability of receiving and processing messages 22 while handling requests from one or more open systems hosts 18.

In a preferred embodiment, the messages 22 sent from the support controller 20 to the host adapters 16 have a standard format that includes the following:

Function code: indicates the purpose of the message

Destination ID: adapter address

Source ID

Path

Length of message

Response queue: indicates where adapter is to send acknowledgement

Response ID

Flags for additional information

Data being transferred

The data being transferred pertains to LUNs, in particular their addresses and sizes:

Port

Target ID

LUN

Mode

Primary adapter

Secondary adapter

Logical ID

Logical start cylinder

Logical end cylinder

LUN start block

LUN end block

The host adapters 16 process this data received from the support controller 20 and update their internal tables with the new information.

Figure 3A:
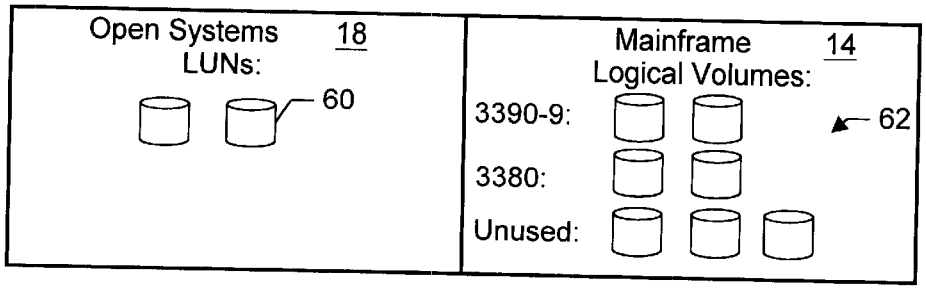
FIGS. 3A–3D are diagrams illustrating different ways of reassigning logical volumes 24 to open systems host LUNs via messaging.

FIGS. 3A–3D are diagrams illustrating example methods of reassigning logical volumes 24 to open systems host LUNs via messaging. FIG. 3A shows an open systems host 18 having two LUNs 60, and a mainframe host 14 having several logical volumes 62, some of which are unused. Examples of logical volumes include an IBM 3390-9 and 3380.

Figure 3B:
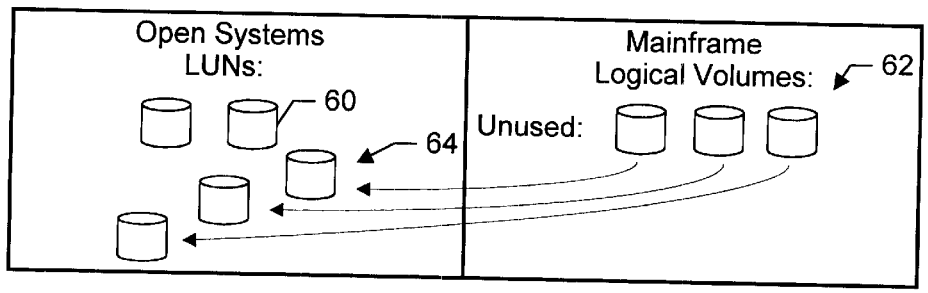

FIG. 3B shows that the reassignment of the logical volumes 62 from the mainframe host 14 side to LUNs 60 may be one-to-one, in which one logical volume 62 is assigned to a single open systems LUN 64.

Figure 3C:
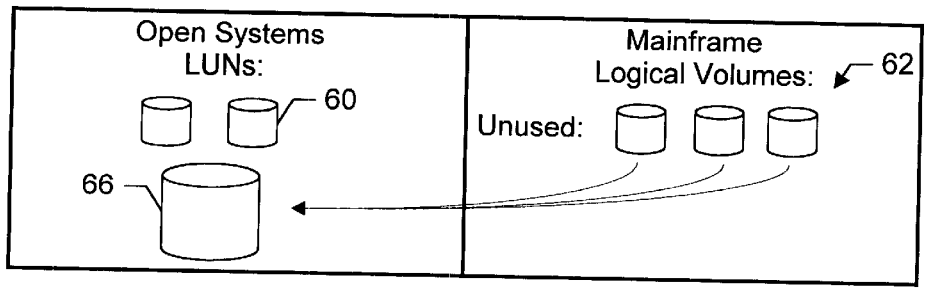

FIG. 3C shows a reassignment of the logical volumes 62 from the mainframe host 14 to the open systems host 18 in which multiple logical volumes 62 are assigned to a single open systems LUN, creating one large LUN 66.

Figure 3D:
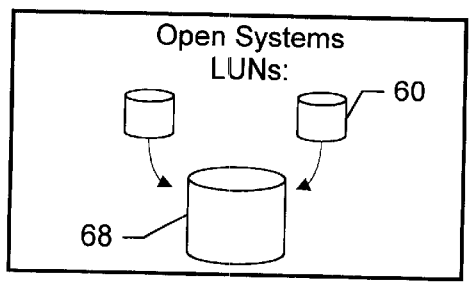

FIG. 3D shows that a reassignment is also valid within the open systems host 18 itself by reassigning logical volumes 24 from individual LUNs 60 to a different target LUN, creating a single large LUN 68.

In a further aspect of the present invention, unused LUNs on the open systems host 18 side may also be dynamically reassigned to logical volumes 24 on the storage subsystem 10 for use by the main host 14. The only extra step required is that when that when the LUN's are reassigned as logical volumes 24 after being used as LUN's, the logical volumes 24 need to be reformatted for use by the mainframe host 14. This is accomplished without suspending the host processes by sending messages from the support controller 20 to the affected host adapter 16*a*, while access to the logical volumes/LUN's from the open systems host 18 is restricted. It should be kept in mind, however, that this reformatting does not need to take place when reassigning a logical volume 24 to a LUN.

A method and system for reassigning unused logical volumes on a storage subsystem to an open systems host that uses logical unit numbers (LUNs) has been disclosed that increasing the storage capacity of the open systems host without shutting down and disrupting the system. Reconfiguring the system with real-time messaging as described herein provides enterprises with a flexible method for using excess storage subsystem capacity in support of open systems hosts.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for reassigning unused logical volumes on a storage subsystem to an open systems host that uses logical unit numbers (LUNs), wherein the storage subsystem and the open systems host execute respective software processes, the method comprising the steps of:
    (a) connecting the open systems host to the storage subsystem via a SCSI adapter, wherein the open systems host accesses the storage subsystem through LUNs;
    (b) connecting a mainframe to the storage subsystem via a mainframe adapter, wherein the mainframe accesses the storage subsystem through logical volumes;
    (c) connecting a support controller to the SCSI adapter and to the mainframe adapter, wherein the support controller and the mainframe adapter run a common operating system;
    (d) sending a communication message from the support controller to the mainframe SCSI adapters, wherein the communication message reassigns the unused logical volumes to LUNs; and
    (e) updating a logical-to-physical mapping stored within the mainframe and SCSI adapters in response to receiving the communication message, thereby increasing storage capacity of the open systems host without needing to suspend the software processes.

2. The method of claim 1 further including the steps of determining if there is a need on the open systems host for additional storage capacity, and ensuring that the unused logical volumes are disabled before performing step (a).

3. The method of claim 2 wherein step (d) further includes the step of:
    i) sending an acknowledgement of receipt from the mainframe and SCSI adapters to the support controller.

4. The method of claim 3 further including the steps of:
    f) reassigning unused LUNs from the open systems host to the storage subsystem.

5. A system for reassigning unused logical volumes to logical unit numbers (LUNs), comprising;
    an open systems host;
    a main frame computer;
    a storage subsystem for storing data, the storage subsystem including
        a mainframe adapter for allowing the mainframe computer access to the data, wherein the mainframe computer accesses the data in the form of logical volumes, and
        a SCSI adapter for allowing the open systems host access to the data, wherein the open systems accesses the data in the form of LUNs; and
    an external support controller for administering the storage subsystem, the support controller in communication with the first and second adapters for:
        sending a first communication message to the SCSI adapter reassigning the unused logical volumes to LUNs, and
        sending a second communication message to the mainframe adapter restricting access to the reassigned logical volumes, whereby storage capacity of the open systems host is increased without system disruption.

6. The system of claim 5 wherein the support controller and the mainframe and SCSI adapters run a common operating system.

7. The system of claim 6 wherein in response to receiving the mainframe communication message, the mainframe adapter updates a logical-to-physical mapping stored within the mainframe adapter.

8. The system of claim 7 wherein unused LUNs from the open systems host are reassigned to the storage subsystem.

9. A computer-readable medium containing program instructions for reassigning unused logical volumes on a storage subsystem to an open systems host that uses logical unit numbers (LUNs), wherein the storage subsystem and the open systems hosts execute respective software processes, the computer-readable medium, the program instructions for:
    (a) connecting the open systems host to the storage subsystem via a SCSI adapter, wherein the open systems host accesses the storage subsystem through LUNs;
    (b) connecting a mainframe to the storage subsystem via a mainframe adapter, wherein the mainframe accesses the storage subsystem through logical volumes;
    (c) connecting a support controller to the SCSI adapter and to the mainframe adapter, wherein the support controller and the mainframe adapter run a common operating system;
    (d) sending a communication message from the support controller to the mainframe and SCSI adapters, wherein the communication message reassigns the unused logical volumes to LUNs; and
    (e) updating a logical-to-physical mapping stored within the mainframe and SCSI adapters in response to receiving the communication message, thereby increasing storage capacity of the open systems host without needing to suspend the software processes.

10. The computer-readable medium of claim 9 further including the instructions of determining if there is a need on the open systems host for additional storage capacity, and ensuring that the unused logical volumes are disabled before performing instruction (a).

11. The computer-readable medium of claim 10 wherein instruction (d) further includes the instruction of:

i) sending an acknowledgement of receipt from the mainframe and SCSI adapters to the support controller.

12. The computer-readable medium of claim 11 further including the instructions of:

f) reassigning unused LUNs from the open systems host to the storage subsystem.

13. A method for reassigning unused logical volumes on a storage subsystem to an open systems host that uses logical unit numbers, wherein the storage subsystem and the open systems hosts execute respective software processes, the method comprising the steps of:

(a) connecting the open systems host to the storage subsystem via a SCSI adapter running a first operating system process, wherein the open systems host accesses the storage subsystem through LUNs;

(b) connecting a mainframe to the storage subsystem via a mainframe adapter, wherein the mainframe accesses the storage subsystem through logical volumes;

(c) administering the storage subsystem, which includes the mainframe adapter and the SCSI adapter, from a support controller running a second operating system process;

(d) sending a communication message from the second operating system process of the support controller to the first operating system process of the SCSI adapter, wherein the communication message reassigns the unused logical volumes to open systems logical addresses;

(e) sending an acknowledgement of receipt from the SCSI adapter to the support controller; and (f) updating a logical-to-physical mapping stored within the SCSI adapter in response to receiving the communication message, such that open systems host logical unit numbers are mapped to the unused logical volumes, thereby increasing storage capacity of the open systems host without suspending the software processes.

* * * * *